(No Model.)
W. C. PERKINS.
NUT LOCK.
No. 599,250. Patented Feb. 15, 1898.
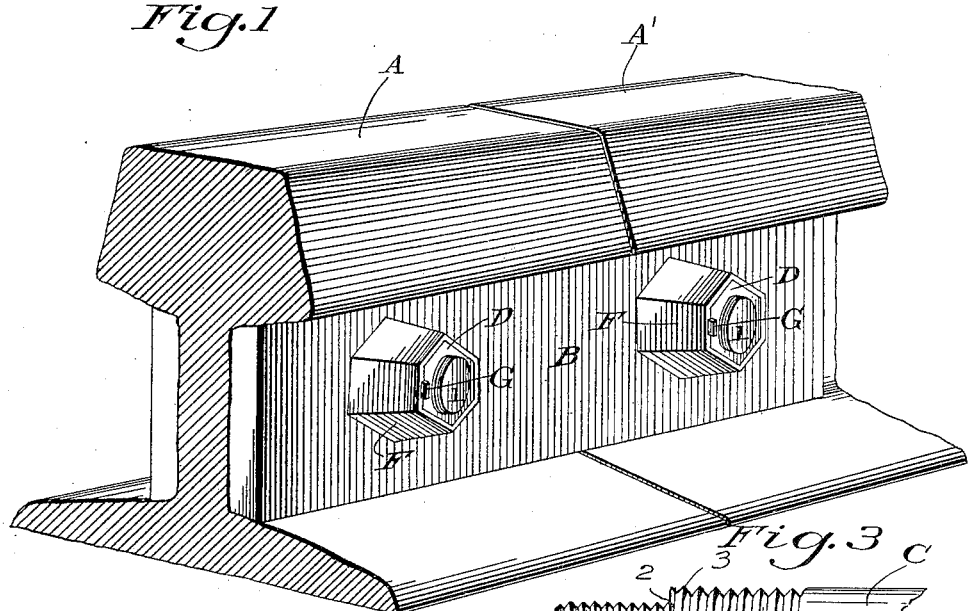
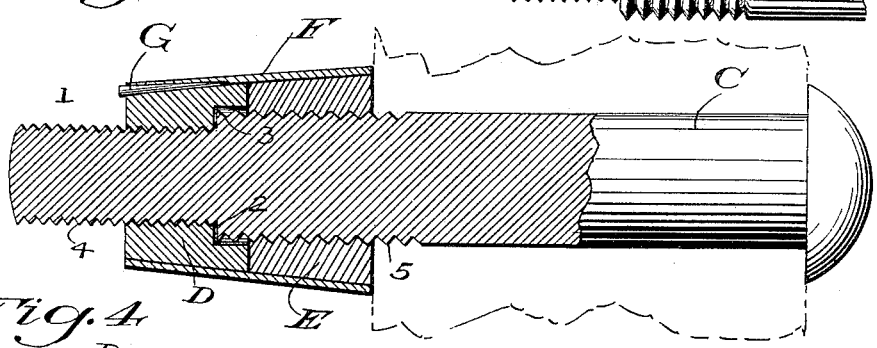
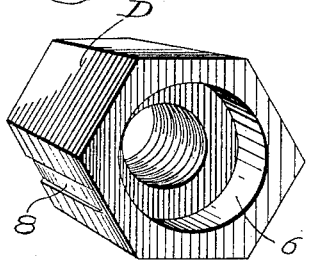
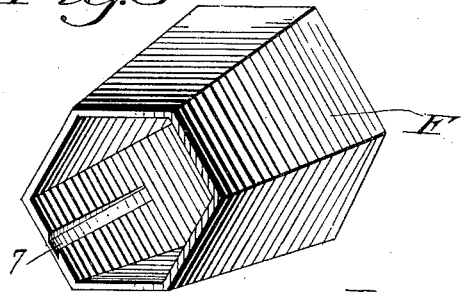
Witnesses
B. Krueger
C. H. Zable
Inventor
William C. Perkins
By his Atty. O. B. Reichelt

UNITED STATES PATENT OFFICE.

WILLIAM C. PERKINS, OF ROCKY HILL STATION, KENTUCKY.

NUT-LOCK.

SPECIFICATION forming part of Letters Patent No. 599,250, dated February 15, 1898.

Application filed December 21, 1896. Serial No. 616,476. (No model.)

*To all whom it may concern:*

Be it known that I, WILLIAM C. PERKINS, a citizen of the United States, and a resident of Rocky Hill Station, in the county of Edmonson and State of Kentucky, have invented certain new and useful Improvements in Nut-Locks, of which the following is a specification.

The object of my invention is to provide a nut-lock which will be simple, strong, secure, and compact, which may be as easily applied as a nut or washer, and which may be removed or replaced without destroying, mutilating, or changing any of the parts comprising the device.

My invention consists in certain details of construction embodying a clamping-nut and a locking-nut, having, respectively, right and left hand threads to fit corresponding threads upon the end of the bolt and made tapering to receive a pyramidal shell to fit the adjacent sides of the said nuts, and a key fitted between the said cap and the adjacent nut, as will hereinafter appear.

In the accompanying drawings, which illustrate my invention, Figure 1 is a perspective view of a railroad-rail joint, with bolts and nuts secured thereon by my improved nut-lock; Fig. 2, an enlarged elevation, partly in section, of a bolt and nuts in place upon a beam, illustrating my invention; Fig. 3, a view in side elevation of one end of a bolt, having right and left hand threads of unequal pitch, the outer end thereof being smaller in diameter and in pitch of thread than the inner end thereof; Fig. 4, a perspective view of the outer or locking nut, showing the inner face and recess thereof; and Fig. 5, a perspective view of the pyramidal cap, looking from the smaller end thereof, as will hereinafter appear.

In the rail-joint shown in Fig. 1 of the drawings the rails A A' are coupled together by the fish-plates B and bolts C in the usual manner. The bolts C are reduced in diameter at the outer end 1 thereof to provide a square shoulder 2, between said reduced portion and the adjacent portion 3, against which the lock-nut upon the reduced end of the bolt may be pressed.

The thread 4, fitted with the lock-nut D upon the reduced end of the bolt, is of less pitch than the thread 5, fitted with the clamping-nut E upon the inner or larger diameter 3 of the bolt, and the said nut D screwed thereon will hug tightly against the shoulder 2 or against the outer face of the nut E and require a longer and greater number of turns to loosen its hold than would a nut and bolt having threads of greater pitch. The inner and larger nut and stronger thread upon said bolt will admit of the said nut being screwed with greater force against the plate or face to which it is clamped and takes the strain from the locking-nut, so that there is no danger of stripping the smaller threads from the reduced end of the nut.

The locking-nut D has a recess 6 in its inner face to fit over and receive the shoulder 2 of the bolt C and follow up the nut E after it has passed the said shoulder until the bottom of said recess shall have reached and been intercepted by said shoulder.

The clamping-nut and locking-nut are thus allowed ample room for adjustment without lost motion or loose connection between them. The nut D is smaller than nut E in proportion to the respective diameters of the bolt upon which they are fitted and in accordance with the proportions usually followed in such cases, and the sides of the said nuts are tapered outwardly and are of corresponding pitch to provide continuous plane pyramidal surfaces, upon which are fitted a pyramidal cap F, made of sheet metal to conform to and closely fit over both of the said nuts D and E, and serve not only as an auxiliary lock, but as a protecting-cover to the said nuts. The inner surface of the cap F has a key-seat 7 formed longitudinally therein, of diminishing taper to the inner end thereof, and the locking-nut D has a key-seat 8, similarly tapered to register with the seat 7, the said key-seats being adapted to receive a key G, as shown in Fig. 2, to hold the cap F securely upon the nuts. As the nuts and cap are correspondingly tapered, the latter may be driven on as tightly as required to hold it in place; but the key permits them to be more easily removed.

I claim as my invention and desire to secure by Letters Patent—

1. A bolt and nut-lock comprising a bolt having sections of unequal diameter and threads of unequal pitch and fitted respectively with a clamping-nut and a locking-nut correspondingly threaded, and having tapering exterior walls and a cap correspondingly tapered, substantially as described.

2. A bolt and nut-lock comprising a bolt having sections of unequal diameter, a clamping-nut and a locking-nut fitted thereon and having tapering exterior walls, a cap correspondingly tapered and provided with a key-seat and a key adapted to fit said seat, substantially as described.

In testimony that I claim the foregoing as my invention I have signed my name in the presence of two subscribing witnesses.

WILLIAM C. PERKINS.

Witnesses:
BRUCE PERKINS,
A. L. CLEVENGER.